(12) United States Patent
Jönzon

(10) Patent No.: US 12,011,866 B2
(45) Date of Patent: Jun. 18, 2024

(54) SYSTEM AND METHOD FOR PRODUCING A MULTIPLE LAYER MATERIAL

(71) Applicant: Wellplast AB, Åstorp (SE)

(72) Inventor: Anders Jönzon, Råå (SE)

(73) Assignee: WELLPLAST AB, Åstorp (SE)

( * ) Notice: Subject to any disclaimer, the term of this patent is extended or adjusted under 35 U.S.C. 154(b) by 413 days.

(21) Appl. No.: 17/293,508

(22) PCT Filed: Nov. 11, 2019

(86) PCT No.: PCT/EP2019/080821
§ 371 (c)(1),
(2) Date: May 13, 2021

(87) PCT Pub. No.: WO2020/104228
PCT Pub. Date: May 28, 2020

(65) Prior Publication Data
US 2021/0402675 A1   Dec. 30, 2021

(30) Foreign Application Priority Data
Nov. 21, 2018   (EP) ..................................... 18207455

(51) Int. Cl.
*B29C 53/26*   (2006.01)
*B29C 65/00*   (2006.01)

(52) U.S. Cl.
CPC ........ *B29C 53/265* (2013.01); *B29C 66/5346* (2013.01); *B29C 66/83413* (2013.01); *B29C 66/73921* (2013.01)

(58) Field of Classification Search
CPC .............. B29C 53/265; B29C 66/5346; B29C 66/73921; B29C 66/83413
See application file for complete search history.

(56) References Cited

U.S. PATENT DOCUMENTS

| | | |
|---|---|---|
| 3,666,590 A | 5/1972 | Rinnosuke et al. |
| 3,887,320 A | 6/1975 | Erlewine et al. |
| 5,340,518 A | 8/1994 | Paul |
| 6,939,425 B1 | 9/2005 | Anders et al. |

OTHER PUBLICATIONS

PCT International Search Report and Written Opinion dated Jan. 28, 2020 for Intl. App. No. PCT/EP2019/080821, from which the instant application is based, 9 pgs.

*Primary Examiner* — Thu Khanh T. Nguyen
(74) *Attorney, Agent, or Firm* — FREDRIKSON & BYRON, P.A.

(57) ABSTRACT

A system for producing a multiple layer material (49), comprising first and second corrugation rolls (14, 15) for providing a corrugated profile (16) having a plurality of crests (47), wherein the system further comprises first and second press rolls (21, 22) for applying a material sheet (19, 20) to crests (47) of the corrugated profile (16), and a plurality of heating members (28) arranged between the press rolls (21, 22) for welding the material sheet (19, 20) to the crests (47) of the corrugated profile (16) to form the multiple layer material (49). A guiding plate (48) is arranged between the corrugation 10 rolls (14, 15) and the heating members (28). The guiding plate (16) is arranged with a profile engaging side (50) having a plurality of crests (52) corresponding to the crests (47) of the corrugated profile (16). A cooling arrangement is provided for cooling the guiding plate (48). A method for producing the multiple layer material (49) is also disclosed.

17 Claims, 7 Drawing Sheets

SYSTEM AND METHOD FOR PRODUCING A MULTIPLE LAYER MATERIAL

RELATED APPLICATIONS

Figure 1:
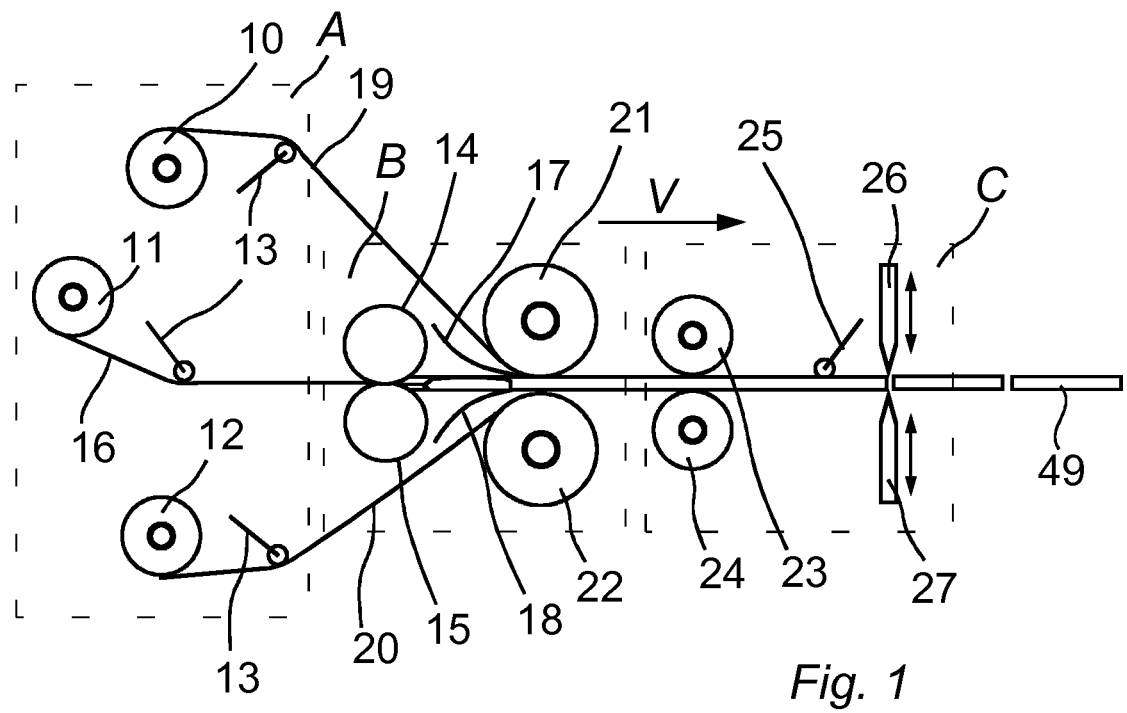

This application is a 35 U.S.C. 371 national stage filing from International Application No. PCT/EP2019/080821, filed Nov. 11, 2019, which claims priority to European Application No. 18207455.9, filed Nov. 21, 2018, the teachings of which are incorporated herein by reference.

FIELD OF THE INVENTION

The invention relates to a system for producing a multiple layer material. More specifically, the present invention relates to a system for producing a multiple layer material comprising first and second corrugation rolls for providing a corrugated profile, and heating members for welding a material sheet to the corrugated profile to form the multiple layer material.

Multiple layer materials of this type generally include polymer materials, wherein the corrugated profile includes at least one type of polymer materials and the material sheet includes at least one type of polymer materials, so that they can be welded together. For example, the corrugated profile and the material sheet comprises a thermoplastic material, such as a polyolefin. Multiple layer materials of this type are generally used as packaging material to protect different kinds of goods during transport and handling. Multiple layer materials of this type can also be used within packaging industry for manufacturing packages containing a variety of different kinds of goods.

The present invention also relates to a method for producing such a multiple layer material.

PRIOR ART

There is a plurality of different types of devices and processes for producing multiple layer materials in the prior art. One such type of device comprises first and second corrugation rolls for providing a corrugated plastic profile, heating members for heating the corrugated plastic profile, and press rolls for applying a plane plastic sheet to the corrugated plastic profile and thereby welding the plane plastic sheet to the corrugated plastic profile to provide the multiple layer material.

There is a need to improve the production process of such multiple layer materials for the packaging industry. Hence, there is a need to provide a more efficient system and method for producing multiple layer materials comprising one or more polymer materials.

One problem with prior art devices for producing such multiple layer materials is that they are inefficient.

SUMMARY

An object of the invention is to provide a system and a method for efficient production of a multiple layer material comprising a corrugated profile and a material sheet adhered to said corrugated profile, wherein the corrugated profile and the material sheet includes a polymer material. The system and method of the present invention results in a faster and more reliable production of the multiple layer material, wherein less production stops and a more cost-efficient production is achieved and less maintenance is required.

The present invention relates to a system for producing a multiple layer material, comprising first and second corrugation rolls for providing a corrugated profile having a plurality of crests, wherein the system further comprises first and second press rolls for applying a material sheet to crests of the corrugated profile, and a plurality of heating members arranged between the press rolls for welding the material sheet to the crests of the corrugated profile to form the multiple layer material, characterised in that a guiding plate is arranged between the corrugation rolls and the heating members, wherein the guiding plate is arranged with a profile engaging side having a plurality of crests corresponding to the crests of the corrugated profile, and wherein a cooling arrangement is provided for cooling the guiding plate. The combination of the guiding crests and the cooling arrangement of the guiding plate has been found to stabilise the corrugated profile for efficient guiding towards the heating members, so that the production speed and reliability can be increased and time for maintenance due to production stops can be reduced, which in turn also results in increased cost-efficiency.

The corrugation rolls can be provided with a plurality of grooves and tops, wherein the crests of the guiding plate are aligned with the tops of one of the corrugation rolls. For example, the crests of the guiding plate can be aligned with the tops of a lower corrugation roll. Hence, efficient support and guidance of the corrugated profile is achieved from the corrugation rolls while the corrugated profile simultaneously is cooled to increase stability and further enhance the guiding thereof towards the heating members. The crests of the guiding plate can be aligned with the heating members, wherein the corrugated profile is efficiently supported and guided between the corrugation rolls and the heating members. The crests can also be aligned with edges of core bars provided with the heating members.

The guiding plate can be arranged with a cooling conduit for cooling the guiding plate by means of a coolant for efficient cooling of the guiding plate and the corrugated profile running over it. For example, the conduit is connected to a source of coolant, so that the coolant can be circulated through the cooling conduit, which further improves the cooling efficiency of the guiding plate and the corrugated profile.

The profile engaging side of the guiding plate can be convex, so that each crest is curved in its longitudinal direction. Hence, the corrugated profile running over the guiding plate is pressed against the guiding plate and subject to tensioning, which even further enhances the guiding effect and prevents the crests of the corrugated profile from leaving the crests of the guiding plate. The profile engaging side of the guiding plate can be displaced in relation to an imaginary straight line between the tops of the second corrugation roll and the heating members to press the guiding plate against the corrugated profile. Such a displacement of the guiding plate puts further tension to the corrugated profile in contact therewith and prevents the corrugated profile from disengaging the profile engaging side of the guiding plate to give high precision guiding of the corrugated profile between the corrugation rolls and the heating members together with the cooling thereof.

The system can comprise first and second press rolls for applying the material sheet to the crests of the corrugated profile. The heating members can be arranged between the press rolls. Hence, the corrugated profile can run between the corrugation rolls and the press rolls and the guiding plate can extend between the corrugation rolls and the press rolls.

The present invention is also related to a method for producing a multiple layer material, comprising the steps of a) corrugating a sheet of material by means of first and second corrugation rolls and thereby form a corrugated profile having a plurality of crests,
b) heating the corrugated profile at the crests by means of a plurality of heating members,
c) applying a sheet of material to the crests of the corrugated profile and thereby welding the sheet of material to the crests of the corrugated profile to form the multiple layer material,
characterised by the steps of
d) after step a) and before step b) bringing the corrugated profile into contact with and along a guiding plate with a profile engaging side having a plurality of crests corresponding to the crests of the corrugated profile, and
e) cooling the guiding plate and thereby cooling the corrugated profile by means of the guiding plate.

Further characteristics and advantages of the present invention will become apparent from the description of the embodiments below, the appended drawings and the dependent claims.

SHORT DESCRIPTION OF THE DRAWINGS

Figure 2:
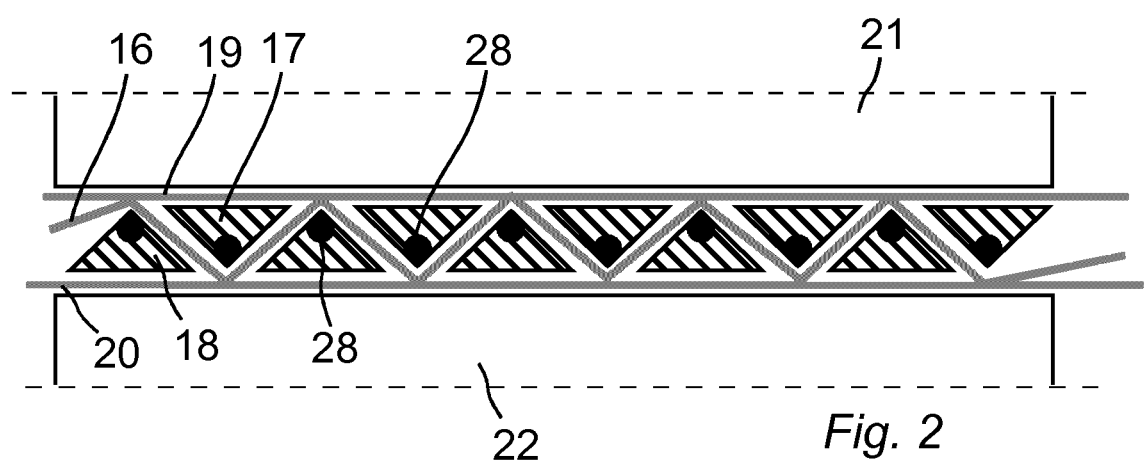
Figure 3:
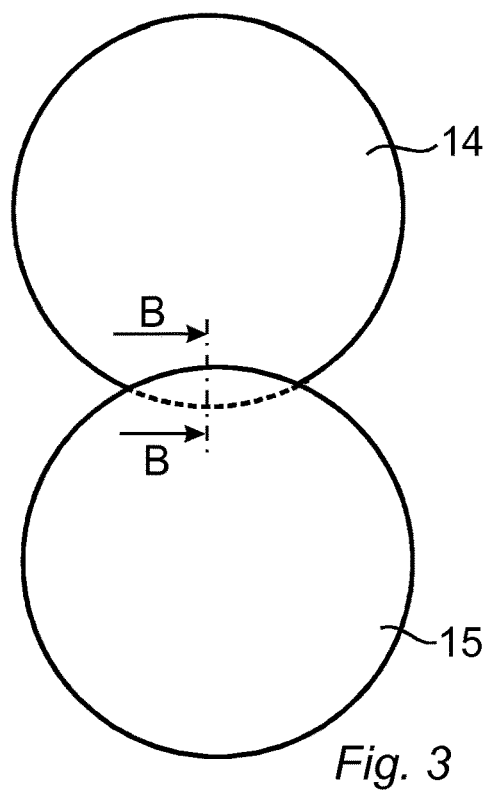
Figure 4:
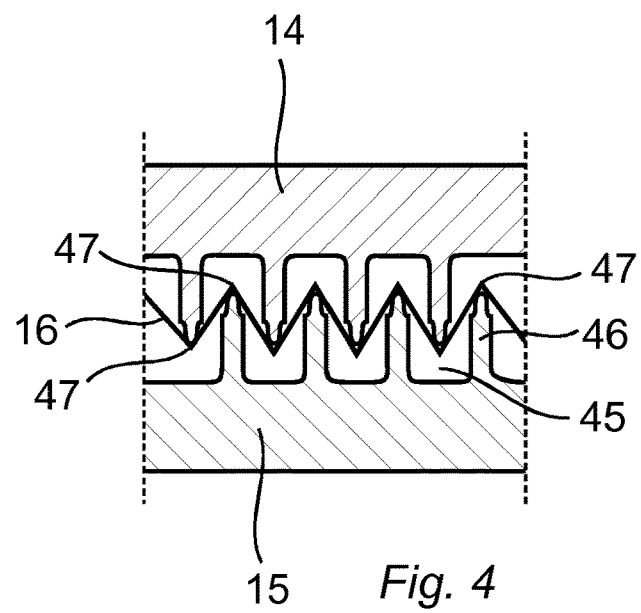
Figure 5:
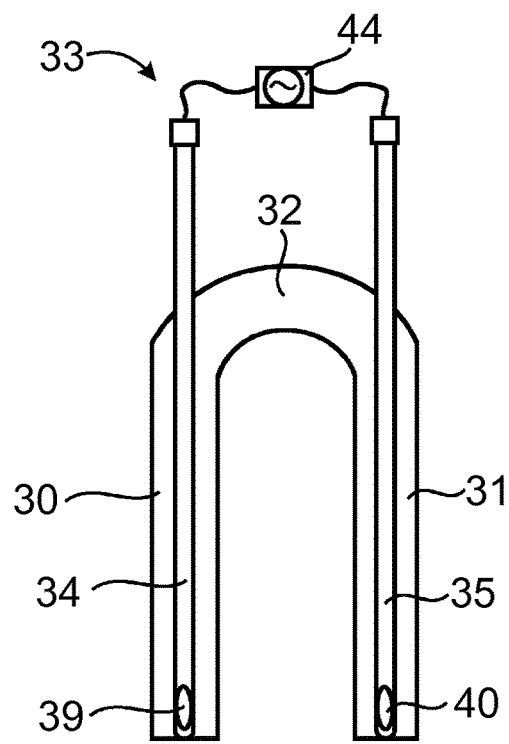
Figure 6:
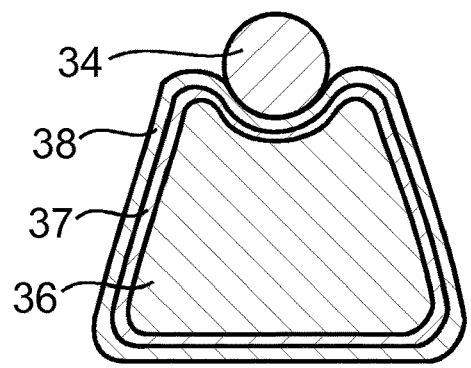
Figure 7:
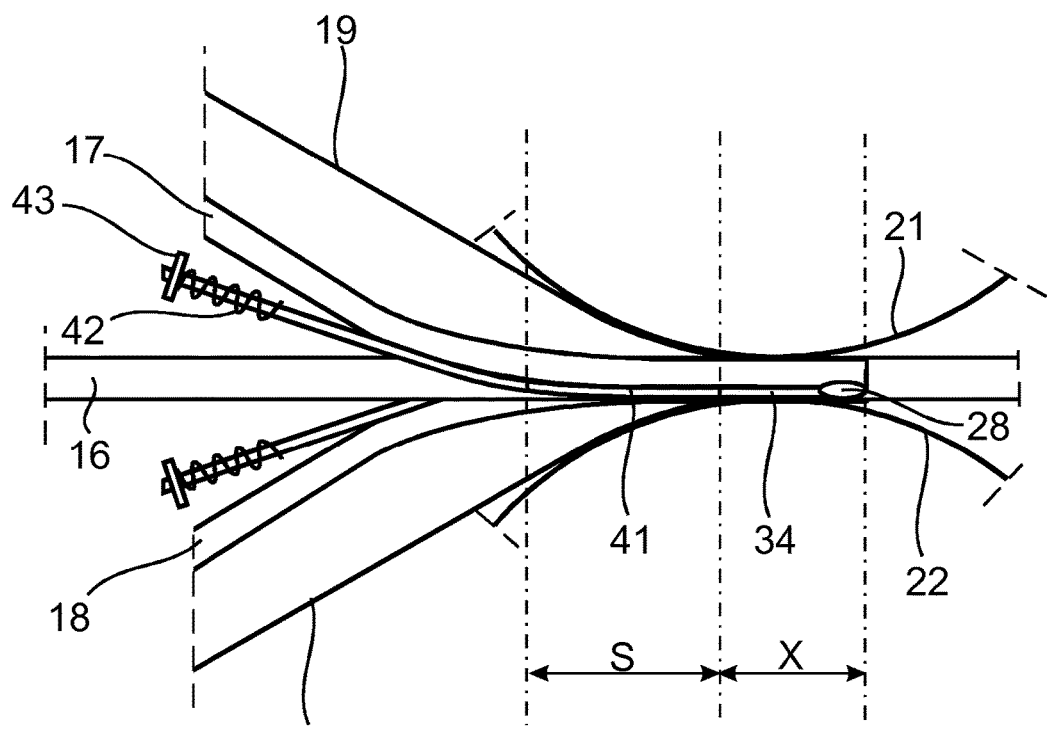
Figure 8:
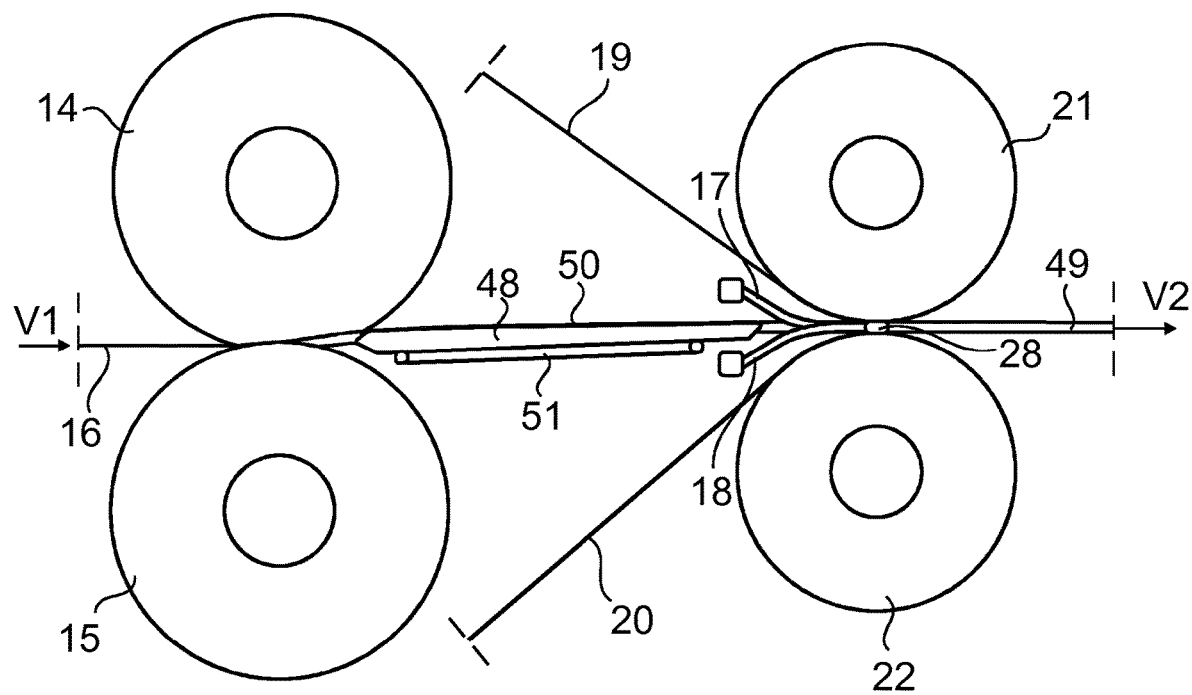
Figure 9:
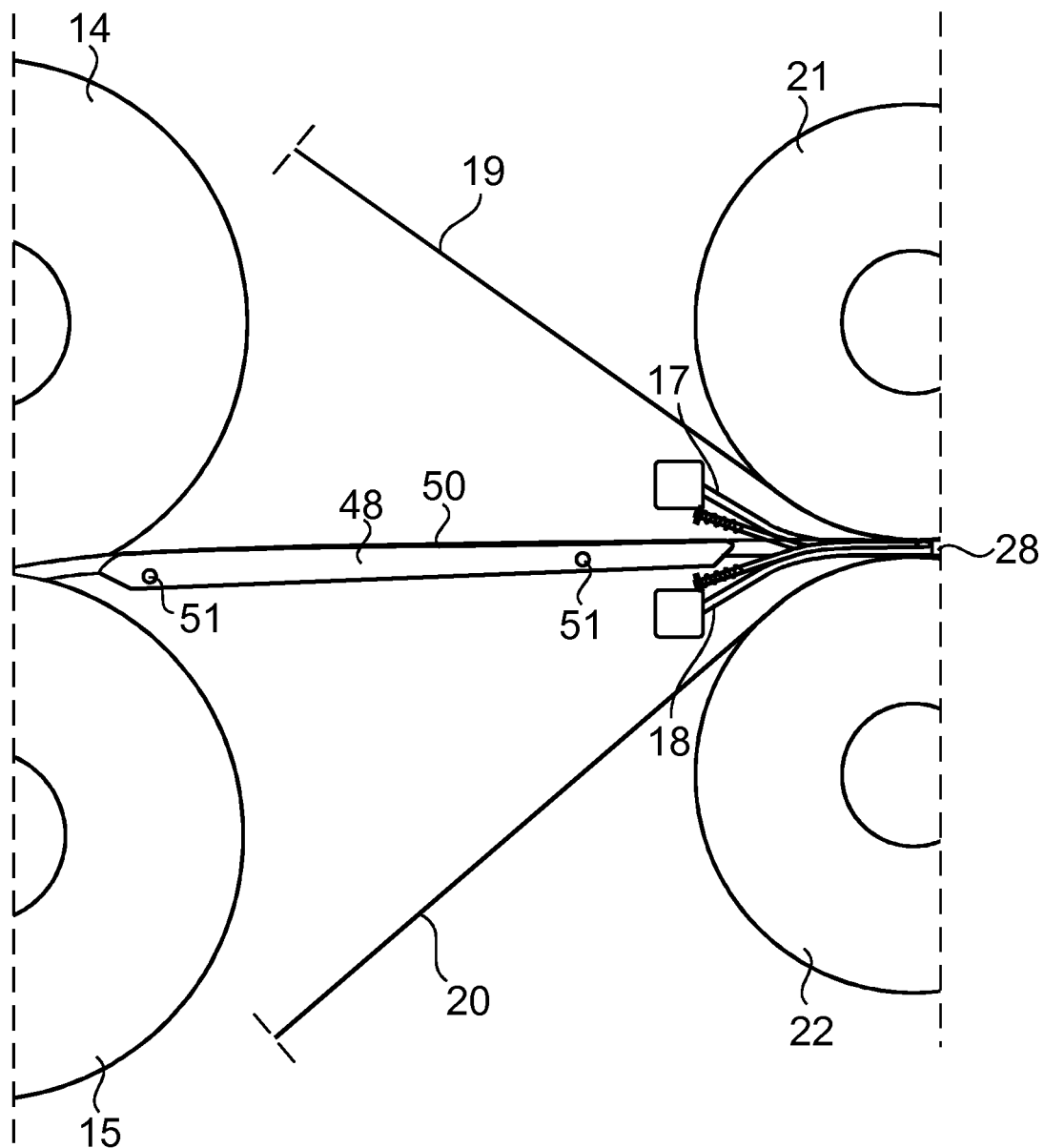
Figure 10:
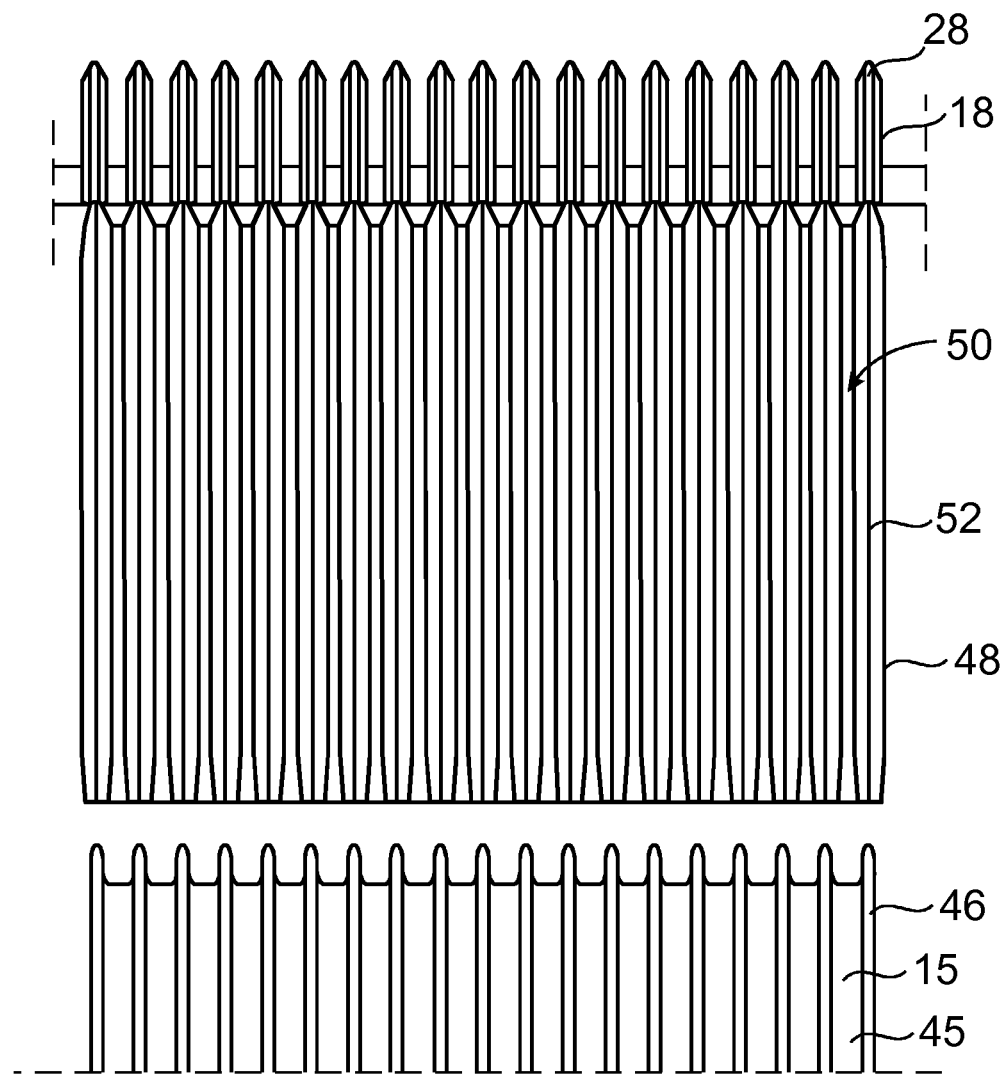
Figure 11:
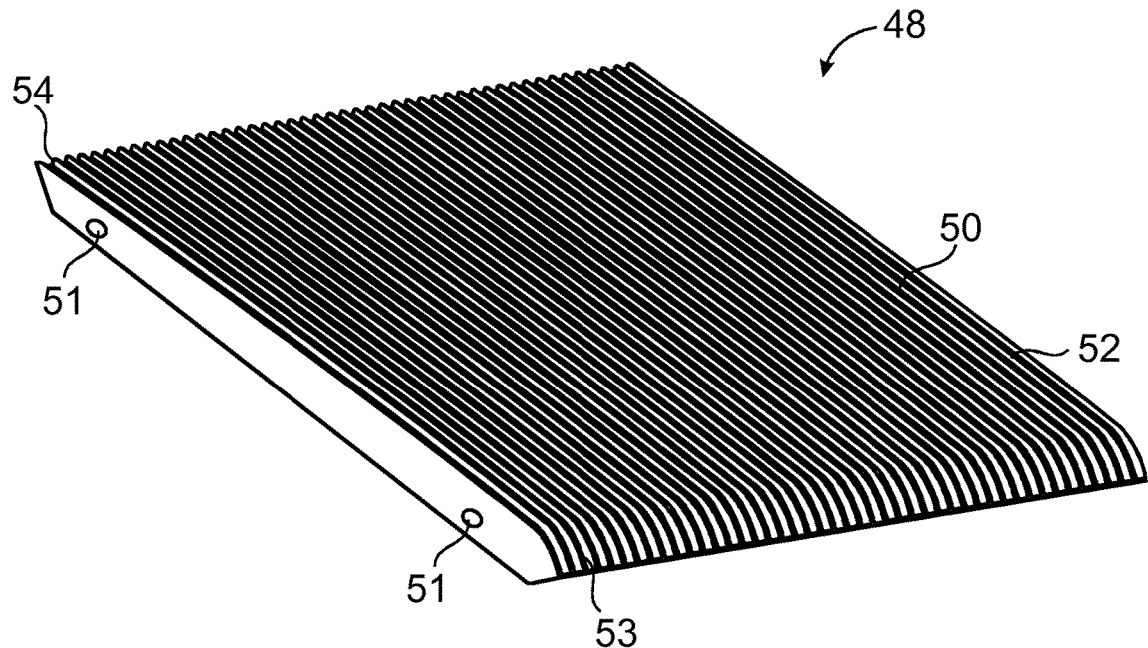
Figure 12:
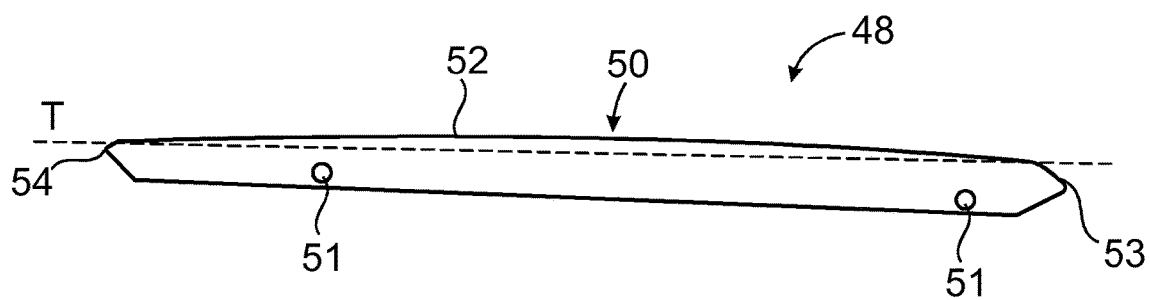
Figure 13:
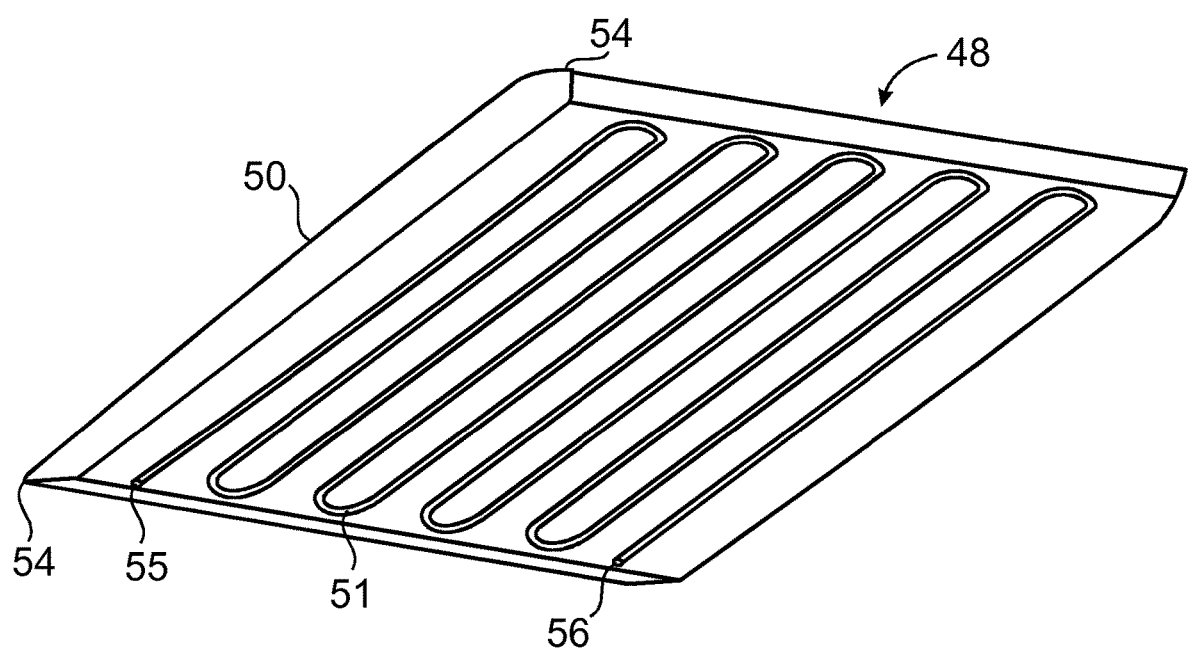

The invention will now be described more in detail with the aid of embodiment examples and with reference to the appended drawings, in which FIG. 1 is a schematic side view of a system for producing a multiple layer material having a corrugated profile and first and second material sheets adhered thereto according to one embodiment, FIG. 2 is a schematic cross-sectional view of a part of the system, illustrating heating members and press rolls of the system for adhering the first and second material sheets to a single corrugated profile according to a first embodiment, FIG. 3 is a schematic side view of corrugation rolls for forming a material sheet into the corrugated profile according to one embodiment, FIG. 4 is a schematic cross-sectional view from the line B-B in FIG. 3 of the corrugation rolls, illustrating tops and grooves of the corrugation rolls according to one embodiment, FIG. 5 is a schematic view of a pair of upper or lower heating members in the shape of core bars, illustrating the design of resistance wires thereof according to one embodiment, FIG. 6 is a schematic cross-sectional view of a core bar according to one embodiment, FIG. 7 is a schematic side view of a part of section B of the system according to FIG. 1, partially illustrating the press rolls and illustrating core bars with the heating members according to one embodiment, FIG. 8 is a schematic side view of a part of the system, illustrating a guiding plate between the corrugation rolls and the heating members according to one embodiment, FIG. 9 is a schematic side view of a part of the system, illustrating the guiding plate more in detail, FIG. 10 is a schematic top view of a part of the system, illustrating the guiding plate between the corrugation rolls and the heating members according to one embodiment, FIG. 11 is a schematic perspective view of the guiding plate according to one embodiment, illustrating a profile engaging surface of the guiding plate according to one embodiment, FIG. 12 is a schematic side view of the guiding plate according to one embodiment, illustrating a curvature of the profile engaging surface, and FIG. 13 is a schematic side view of the guiding plate according to one embodiment, illustrating a cooling arrangement of the guiding plate.

DETAILED DESCRIPTION

Referring to FIG. 1 a system and a method for producing a multiple layer material is illustrated schematically according to one embodiment. The system can also be called a device or a manufacturing line. The method can also be called a process. The system is arranged for producing a multiple layer material comprising at least one polymer material, such as a plastic material, e.g. in the form of a thermoplastic material, such as a polyolefin. The multiple layer material is, e.g. a packaging material or is used for providing a packaging material for protecting goods during transport and handling or is used for producing packages in the package industry.

The system comprises a first section A, which is showed with dashed lines in FIG. 1. In the embodiment of FIG. 1 the system comprises a first roll 10, a second roll 11 and an optional third roll 12, all winded up with a suitable material sheet, as well as conventional sheet stretching members 13. Alternatively, the system comprises other conventional devices for storing the material sheets. For example, the system comprises at least two devices for storing sheets, such as the first roll 10 for storing the upper sheet and the third roll 12 for storing the lower sheet.

The material sheets are brought together in a second part B and form different layers of the finished multiple layer material. It should be observed that material thickness, mutual distance between different components and other geometrical relations in FIG. 1 as well as subsequent figures are not necessarily true to scale. A plurality of dimensions and distances have been changed in relation to real conditions in order to show features of the invention more clearly.

The elements that are included in part A are for example made according to prior art. Various sheet materials, both as regards to thickness and the material as such, may be arranged on the different rolls 10, 11, 12. For example, the sheet materials are made of or comprises a thermoplastic material, such as polyethylene (PE) or polypropylene (PP), with or without so called fillers, such as chalk. Alternatively, other materials may be used. For instance, it is possible to use spunbond or nonwoven material to achieve other desirable characteristics or aluminum or other similar material in some layer in order to achieve high tightness against gas permeation. Materials that in itself cannot be heated together with the material of an adjacent sheet should be coated with or arranged next to a plastic layer.

The system comprises a corrugation device having first and second corrugation rolls 14, 15 for corrugating at least one material sheet 16 into a corrugated profile. The material sheet to be corrugated and the corrugated profile is the same sheet and therefore indicated with reference number 16 both before and after corrugation. The corrugation rolls 14, 15 are described more in detail with reference to FIG. 3 and FIG. 4. For example, the sheet 16 is pre-heated before the corrugation. Alternatively, the corrugation rolls 14 and 15 are heated and/or provided with heating elements. In the illustrated embodiment, the first corrugation roll 14 is an upper corrugation roll, wherein the second corrugation roll is a lower corrugation roll. For example, the sheet material 16 to be corrugated is fed from the second roll 11. Hence, in the embodiment of FIG. 1 the corrugation rolls 14, 15 are arranged to corrugate the sheet material 16 from the second roll 11.

After the corrugation device, the corrugated profile 16 is heated by heating members, which are described more in detail below. In the illustrated embodiment, the system comprises core bars 17, 18, such as a first set of core bars 18, such as a lower set of core bars, and a second set of core bars 17, such as an upper set of core bars. In the embodiment of FIG. 1, the sheet 16 is led in between the upper core bars 17 and the lower core bars 18. A first sheet 20, such as a lower sheet, and an optional second sheet 19, such as an upper sheet, are brought together with the corrugated profile 16 at the core bars 17 and 18. The core bars 17 and 18 extend in the common longitudinal direction V of the sheets 16, 19, 20, which is indicated at the corresponding arrow in FIG. 1. The arrow V also indicates a travel direction of the sheets 16, 19, 20. The two sets of core bars 17 and 18 are suspended behind or outside the sheets in a way not shown closer and which, e.g. is conventional.

At least the corrugated profile 16 is heated by the core bars 17 and 18 and joined together with at least the first sheet 20, and optionally also the second sheet 19, to a multiple layer material through co-operation with an upper press roll 21 and a lower press roll 22, which also feeds the sheets forward.

After the joining, the ready-formed sheet material is brought further in the direction of the arrow V in a conventional way, such as by advancing rolls, such as an upper driving roll 23 and an advancing lower driving roll 24. The driving rolls 23 and 24 are included in a third part C, which in a conventional way may comprise at least one cutting mechanism 25, which is laterally adjustable to cut off the sheet material in suitable width, and one cutting mechanism to cut off the sheet material in suitable length. In the embodiment shown, the cutting mechanism for longitudinal cutting comprises an upper knife 26 and a lower knife 27 co-operating therewith. The third part C may be given another design depending on the application in question.

In FIG. 2, an example is shown of how the core bars may be arranged when a sheet material having three layers, one of which is corrugated, is to be produced. In this case, an upper line of core bars 17 is arranged with a certain mutual distance between adjacent core bars. A lower line of core bars 18 is arranged with the same mutual distance, but displaced in relation to the upper line, so that the space between the core bars is filled out with space for an intermediate sheet of material.

All core bars 17, 18 have, in this embodiment, triangular cross-section, but other shapes may be chosen depending on the application in question. The corrugated profile 16 that is to be adhered to the first and second sheets 19, 20 runs between the upper line of core bars 17 and the lower line of core bars 18. The upper sheet 19 runs exactly above the upper line of core bars 17 and will be pressed against the sheet 16 between the lower line of core bars 18 and the upper press roll 21. Correspondingly, the lower sheet 20 runs exactly below the lower line of core bars 18 and will be pressed against the sheet 16 between the upper line of core bars 17 and the lower press roll 22.

The core bars 17 and 18 are provided with heating members 28. By the heating members 28, heat is transferred to abutting and adjacent material sheets to such an extent that a joining of the sheets is achieved. For example, the heating members 28 are arranged to contact the corrugated profile 16, wherein the upper sheet 19 is welded to side of the corrugated profile 16 when brought into contact therewith and pressed thereon by the upper press roll 21. Similarly, the lower sheet 20 is adhered to the opposite side of the corrugated profile 16 by means of the lower press roll 22 if applicable. The heating is local in small contact surfaces, which means that the desired temperature may be attained fast. In a preferred embodiment, the joining takes place in connection with the press rolls 21 and 22 driving the sheets forwards and, consequently, the sheets being in motion. In the other parts, the core bars 17 and 18 are e.g. not heated.

In a simple embodiment, the heating member 28 comprises electric heating conductors, which extend in the longitudinal direction of the core bars and which are supplied from conventional power supply units (not shown). It is also possible to transmit heat to abutting sheet portions in another way. The requisite energy may, e.g., be supplied to the contact surfaces through ultrasound, laser and other similar forms of energy permitting local or directed transmission of energy. The transmission of energy may also take place inductively or in a similar way and then be concentrated in the core bars 17 and 18, so that heating takes place locally.

As mentioned above, there may be different material compositions in the different sheets. Aluminium foil or a similar material may be used in some layer. In certain applications, it is suitable to use an intermediate layer, e.g. the sheet 16, with a lot of filler and one or two outer layers with less filler. Thereby, a multiple layer material is achieved, which resists high load in the channel direction at the same time as the outer layers are very elastic. Such a sheet material is very suitable for use to packaging.

The material thickness may also vary in the different layers and according to the application in question. The sheet 16 that is to be corrugated may in that connection be made in a considerably thicker and stronger material than the other sheets 19, 20 in order to obtain very good properties as for durability and impact resistance. In the same way, also the other sheets 19, 20 and additional sheets forming layers in the multiple layer material may be given desired properties as for, e.g., durability and impact resistance.

The side view in FIG. 3 schematically shows how a device for corrugation of the sheet 16 may be made. The sheet 16, as well as the first corrugation roll 14 and the second corrugation roll 15 may be pre-heated to facilitate corrugation. With reference also to FIG. 4 the first corrugation roll 14 and the second corrugation roll 15 are formed with grooves 45 and tops 46 to form the sheet 16, which sheet 16 for example is a plane sheet, to a corrugated profile having crests 47, such as continuous upper and lower crests extending in the longitudinal direction of the sheet 16. The tops 46 extend from the periphery of the corrugation rolls 14, 15 and are arranged mutually in parallel around the entire circumference of the corrugation rolls 14, 15. The tops 46 of the first corrugation roll 14 are displaced in relation to the tops 46 of the second corrugation roll 15, wherein the tops 46 of the first corrugation roll 14 extend into the grooves 45 of the second corrugation roll 15 and vice versa. For example, the tops 46 and grooves 45 of the first corrugation roll 14 are horizontally displaced in relation to the tops 46 and grooves 45 of the second corrugation roll 15.

The shape of the tops 46 and the grooves 45, respectively, are adapted to the shape of the core bars 17, 18, wherein the sheet 16 e.g. is corrugated for fitting between the upper and lower lines of core bars 17, 18 before it reaches the core bars 17, 18.

Preferably, the tops 46 are rounded for suitable stretching of the sheet 16 in and around the portion of the sheet 16 abutting against the tops 46. The tops 46 are thinner than the grooves 45 to obtain a more favourable corrugation of the sheet to be corrugated and to improve the properties of the corrugated profile. In that way the corrugated profile 16 is provided with linear portions having thicker profile and more stretched, and thus thinner, folds. The sheet 16 also runs clear in the space between the tops 46 and the grooves 45.

The design of the core bars 17, 18 is more evident from FIGS. 5-7. It should be observed that material thickness, mutual distance between different components and other geometrical relations in the figures are not true to scale. For example, the core bars may be considerably more elongated in the longitudinal direction.

With reference to FIG. 5 a first embodiment of the core bars 17, 18 is illustrated, wherein a first core bar 30 is arranged with a bend in the vertical direction. A core bar of the upper set of core bars 17 is arranged with a bend in the vertical direction, the rear portion of the core bar obtaining a higher position than the portion thereof designed for abutment against the sheets. A core bar of the lower set of core bars 18 is arranged with a bend in the vertical direction, the rear portion of the core bar obtaining a lower position than the portion thereof designed for abutment against the sheets. The bend in the vertical direction of the core bar facilitates attachment of the core bars by means of fastening means, which is not described further. Also, abutment of the rear portion of the core bars or the fastening means against the sheets, which consequently is stopping sheets incoming towards the core bars, is avoided.

FIG. 5 illustrates one embodiment of the core bars 17, 18, wherein a first core bar 30 and a second core bar 31 are arranged in parallel in pairs and connected by for example means of a curve 32, forming a substantially horizontal U-shaped core bar pair 33. Further, such a core bar pair 33 is suitably designed with a bend in a vertical direction and the same design is used for upper as well as lower core bar pairs, wherein the curve 32 obtains a higher position than the ends for an upper core bar pair and a lower position for a lower core bar pair. The curve 32 or other suitable solutions as notches in the core bars can be designed to facilitate the fastening of the core bars to a suitable holder. The curve 32 or other connection is also designed to give electrical connection from one core bar to the next within a core bar pair to achieve an electric circuit in an embodiment where resistance wire heating is used, which is not described further. A plurality of core bar pairs 33 may be positioned in parallel with the ends extending in the long direction, forming the upper set and the lower set of core bars 17, 18. The extension of the ends in the long direction results in that the ends extend between the rolls 21, 22. Preferably, the upper core bars 17 and the lower core bars 18 are mutually displaced in the horizontal direction across the long direction so that they overlap each other and each set of core bars can weld together the corrugated profile 16 with the plane sheets 19, 20, respectively.

The core bars 17, 18 further comprise the heating members 28 in the form of electric resistance wires for heating material sheets adjacent the core bars. According to one embodiment of the invention, which is particularly illustrated in FIGS. 5 and 6, a first resistance wire 34 is arranged in a recess along the surface of the first core bar 30 and a second resistance wire 35 is arranged in a recess along the surface of the second core bar 31. Thus, the resistance wires 34, 35 abut against the core bars 17, 18 in a contact portion. FIG. 6 further illustrates the material composition of the core bars according to one embodiment. The core 36 of the core bars is preferably made of steel or any other suitable material, and may consequently be manufactured by cold drawing, hot drawing or rolling, wherein the somewhat triangular profile is obtained. Other shapes may be chosen according to the current application. The profile may then be cut off and curved as desired. Further, the core bars may be coated with an aluminium layer 37, of which the outermost layer is transformed into electronically insolating aluminium oxide 38 by anodisation.

With reference to FIG. 7 the corrugated profile 16 is fed through the core bars 17, 18 in a section S before the tops of the corrugated profile 16 are brought in contact with the plane sheet 19, and the rolls 21, 22 is driving the sheets forward across the resistance wires and the core bars for welding together in a section X. In this embodiment of the invention the resistance wires are provided with a low-resistant material 41 in the section S and on to, or almost on to, the point in which the tops of the corrugated profile 16 abut against the plane sheet 19. Thus, the low-resistant material 41 reduces the resistance and, hence, the temperature in this section of the resistance wire so that the corrugated profile 16 not is stuck in the section S.

Preferably the resistance wires are arranged with a low-resistant material in portions of the resistance wires, which not are to be heated. Thus, the entire resistance wires apart from the section X may be provided with a low-resistant material.

Further, the free end of the resistance wire is provided with a spring formation 42 having a lock washer 43, wherein the resistance wire is kept in a stretched position during the welding. Thus, the advancing action acting upon the resistance wire by friction against the sheets and the rolls is counteracted and the resistance wire is kept stretched, even though the resistance wire is expanded due to heating. The spring formation 42 suitably acts upon the wire with a force which is greater than the friction against the sheets.

With reference to FIG. 8 a part of the system for producing the multiple layer material is illustrated according to one embodiment, wherein a guiding plate 48 is arranged between the corrugation rolls 14, 15 and the heating members 28. The guiding plate 48 is arranged to guide and cool the corrugated profile 16 after corrugation and before one or more material sheets 19, 20 are adhered to the corrugated profile 16 by means of the heating members 28 to form the multiple layer material. The multiple layer material is indicated with reference number 49 in FIG. 8. Hence, the multiple layer material comprises the corrugated profile 16 and one or more sheets 19, 20 adhered to it by heating, so that said one or more sheets 19, 20 are welded to the crests 47 of the corrugated profile 16. For example, the heating members 28 are arranged on core bars 17, 18 as described above. The corrugated profile 16 is brought into contact with the heating members 28 for heating thereof. For example, the corrugated profile 16 is brought into contact with the heating members 28, so that an inner side of the crests 47 are brought into contact with the heating members 28. Hence, the crests 47 of the corrugated profile 16 are heated from one side, i.e. the inner side, wherein the material sheet 19, 20 is adhered to the crests 47 on the opposite side, i.e. the outer side.

In the embodiments of FIGS. 8 and 9, the system comprises two sets of core bars 17, 18, for example forming an upper set and a lower set of core bars, for adhering the upper sheet 19 and the lower sheet 20 to opposite sides of the corrugated profile 16. The material sheet 16 to be corrugated is fed to the corrugation rolls 14, 15 as illustrated by means of the arrow V1 in FIG. 8, wherein the material sheet 16 is corrugated into the corrugated profile 16. Then, the corrugated profile 16 is brought into contact with the guiding plate 48 and is brought along the guiding plate 48 towards the heating members 28, wherein the upper material sheet 19 and the lower material sheet 20 are adhered to the corrugated profile 16 by means of heat from the heating members 28 to output the multiple layer material 49 in a direction illustrated by means of the arrow V2 in FIG. 8.

The guiding plate 48 comprises a profile engaging side 50 for engaging the corrugated profile 16. For example, the profile engaging side 50 is an upper side of the guiding plate 48. For example, the guiding plate 48 is a plate extending substantially in a plane corresponding to the corrugated profile 16. For example, the profile engaging side 50 of the guiding plate 48 is substantially rectangular. The guiding plate 48 comprises a cooling device for cooling the guiding plate 48 and hence also cooling the corrugated profile 16 in contact therewith. For example, the guiding plate 48 comprises a cooling conduit 51 for a coolant, wherein the profile engaging side 50 is cooled by conducting or circulating the coolant through the cooling conduit 51. For example, the cooling conduit 51 is arranged on a side of the guiding plate 48 opposite the profile engaging side 50. Alternatively, the cooling conduit 51 is formed inside the guiding plate 48 as illustrated in FIG. 9. The cooling conduit 51 is, for example, connected to a source of coolant in a conventional manner, which is not illustrated in the drawings.

With reference also to FIG. 10 the profile engaging side 50 of the guiding plate 48 is formed with a plurality of crests 52 corresponding to the crests 47 of the corrugated profile 16. The crests 52 of the guiding plate 48 extend in the travel direction of the corrugated profile 16 and are arranged to receive and support the corrugated profile 16. Hence, the profile engaging side 50 is formed with a shape corresponding to the corrugated profile 16, so that the crests 52 of the guiding plate 48 engages and supports the crests 47 at a back side of the corrugated profile 16, which back side for example is the lower side. The crests 52 of the guiding plate 48 are aligned with the tops 46 of one of the corrugation rolls 14, 15, such as the tops 46 of the lower corrugation roll 15. Hence, the crests 47 of the corrugated profile 16 are fed onto the crests 52 of the guiding plate 48. For example, the guiding plate 48 is arranged as close as possible to the corrugation rolls 14, 15, so that an unsupported transport gap of the corrugated sheet 16 between the corrugation rolls 14, 15 and the guiding plate 48 is as small as possible. The crests 52 of the guiding plate 48 are aligned with the heating members 28. For example, the core bars 17, 18 are arranged with a triangular cross section as described above, wherein the heating member 28 is arranged at one edge of each of the core bars 17, 18. For example, the crests 52 of the guiding plate 48 are aligned with such edges of one set of the core bars 17, 18. For example, the crests 52 of the guiding plate 48 are aligned with upper edges of the lower core bars 18. Hence, the guiding plate 48 is arranged to guide the corrugated profile 16 between the corrugation rolls 14, 15 and the heating members, so that the crests 47 formed by the corrugation rolls 14, 15 are received by crests 52 of the guiding plate 48 and guided towards the heating members 28, such as at the upper edges of the lower core bars 18.

With reference to FIGS. 11 and 12 the guiding plate 48 with the crests 52 formed in the profile engaging side 50 is illustrated according to one embodiment. In the illustrated embodiment the guiding plate 48 is arranged with a first edge portion 53 and an opposite second edge portion 54, wherein the first edge portion is arranged towards the corrugation rolls 14, 15 and the second edge portion 54 is arranged towards the heating elements 28 and, if applicable, towards the press rolls 21, 22. In the illustrated embodiment, the first edge portion 53 is slanted or curved towards the side opposite the profile engaging side 50, such as downwards. The second edge portion 54 is, e.g. formed with a chamfer or a curve towards the side opposite the profile engaging side 50, such as downwards.

With reference particularly to FIG. 12 the profile engaging side 50 of the guiding plate 48 is convex, so that each crest 52 is curved in its longitudinal direction. The convex curvature of the profile engaging side 50 is illustrated by the aid of a dashed and straight line T in FIG. 12. For example, the guiding plate 48 is arranged so that the corrugated profile 16 is pressed onto the guiding plate 48 when transported from the corrugation rolls 14, 15 to the press rolls 21, 22. In such an embodiment, the guiding plate 48 is displaced, e.g. upwards, in relation to an outlet position of the corrugated profile 16 from the corrugation rolls 14, 15 and an inlet position of the corrugated profile 16 between the press rolls 21, 22. Hence, the profile engaging side 50 is curved from the first edge portion 53 to the second edge portion 54 and in the travel direction of the corrugated profile 16, so that at least a mid-section of the profile engaging side 50 is convex. The guiding plate 48 is arranged in a position and a shape, so that the corrugated profile 16 is forced against the guiding plate 48 when transported from the corrugation rolls 14, 15 to the heating members 28. For example, the profile engaging side 50 of the guiding plate 48 is displaced, such as upwards, in relation to an imaginary straight line between the tops 46 of the second corrugation roll 18 and the heating members 28 to press the guiding plate 48 against the corrugated profile 16 during its transport between the corrugation rolls 14, 15 and the heating members 28.

With reference to FIG. 13 the guiding plate 48 is illustrated according to yet another embodiment, wherein the cooling conduit 51 is arranged on a side of the guiding plate 48 opposite the profile engaging side 50. For example, the cooling conduit 51 is arranged in a bottom side of the guiding plate 48. In one embodiment this can be done by milling a track in the bottom of the guiding plate 48, which is covered with a separate plane, second bottom plate that seals the cooling fluid circuit 51 inside the bottom of the guiding plate. The cooling conduit 51 is arranged for cooling the guiding plate 48 by means of a coolant as described above. In the embodiment of FIG. 13, the cooling conduit 51 has an inlet 55 and an outlet 56 for the coolant, so that the coolant can be circulated through the cooling conduit 51. Alternatively, the guiding plate 48 is cooled by another type of cooling arrangement, such as one or more cooling cavities for a coolant, a fan or other cooling arrangements, which for example are of conventional type. For example, the coolant is cooled in a conventional manner, such as by means of a heat exchanger connected to the cooling conduit 51, and is not illustrated in the drawings.

The invention claimed is:

1. A system for producing a multiple layer material, comprising first and second corrugation rolls for providing a corrugated profile having a plurality of crests, wherein the system further comprises first and second press rolls for applying a material sheet to the crests of the corrugated profile, and a plurality of heating members arranged between the press rolls for welding the material sheet to the crests of the corrugated profile to form the multiple layer material, wherein a guiding plate is arranged between the corrugation rolls and the heating members, wherein the guiding plate is arranged with a profile engaging side having a plurality of crests corresponding to the crests of the corrugated profile, and wherein a cooling arrangement is arranged in the guiding plate for cooling the guiding plate.

2. The system according to claim 1, wherein the corrugation rolls are provided with a plurality of grooves and tops, wherein the crests of the guiding plate are aligned with the tops of one of the corrugation rolls and the grooves of the other, and wherein the crests of the guiding plate are aligned with the heating members.

3. The system according to claim 1, wherein the guiding plate is arranged with a cooling conduit for cooling the guiding plate by means of a coolant.

4. The system according to claim 3, wherein the cooling conduit is connected to a source of coolant, so that the coolant can be circulated through the cooling conduit.

5. The system according to claim 1, wherein the profile engaging side of the guiding plate is convex, so that each crest of the guiding plate is curved in its longitudinal direction.

6. The system according to claim 1, wherein the profile engaging side of the guiding plate is displaced in relation to an imaginary straight line between the tops of the second corrugation roll and the heating members to press the corrugated profile against the guiding plate.

7. The system according to claim 1, wherein the first corrugation roll is an upper corrugation roll and the second corrugation roll is a lower corrugation roll, wherein the first press roll is an upper press roll and the second press roll is a lower press roll, and wherein the guiding plate extends between the corrugation rolls and the press rolls.

8. The system according to claim 7, comprising an upper set of heating members and a lower set of heating members wherein the upper press roll is arranged for applying an upper material sheet to crests on an upper side of the corrugated profile, and the lower press roll is arranged for applying a lower material sheet to crests on a bottom side of the corrugated profile.

9. The system according to claim 8, comprising a first roll for storing the upper material sheet, a second roll for storing a material sheet to be formed into the corrugated profile, and a third roll for storing the lower material sheet.

10. A method for producing a multiple layer material, comprising the steps of:
   (a) corrugating a sheet of material by means of first and second corrugation rolls and thereby form a corrugated profile having a plurality of crests;
   (b) heating the corrugated profile at the crests by means of a plurality of heating members;
   (c) applying a material sheet to the crests of the corrugated profile by means of press rolls and thereby welding the material sheet to the crests of the corrugated profile to form the multiple layer material;
   (d) after step (a) and before step (b) bringing the corrugated profile into contact with and along a guiding plate with a profile engaging side having a plurality of crests corresponding to the crests of the corrugated profile; and
   (e) cooling the guiding plate and thereby cooling the corrugated profile by means of the guiding plate, wherein a cooling arrangement is arranged in the guiding plate.

11. The method according to claim 10, comprising, after steps (d) and (e) the step of bringing an inner side of the crests of the corrugated profile into contact with the heating members.

12. The method according to claim 10, comprising the step of conducting a coolant through a cooling conduit of the guiding plate for cooling thereof.

13. The method according to claim 12, comprising the step of circulating the coolant from a coolant source to the cooling conduit.

14. The method according to claim 10, comprising the step of feeding the corrugated profile in a curved path along the profile engaging side of the guiding plate and thereby force the corrugated profile against the guiding plate.

15. The method according to claim 10, comprising the steps of guiding upper crests of the corrugated profile to a lower set of heating members by means of the crests of the guiding plate, guiding lower crests of the corrugated profile to an upper set of heating members by means of the guiding plate, applying an upper material sheet to the crests on the upper side of the corrugated profile by means of an upper press roll, and applying a lower material sheet to the crests on the bottom side of the corrugated profile by means of a lower press roll.

16. The system according to claim 1, wherein the guide plate is arranged before the press rolls in production of the multiple layer material.

17. The method according to claim 10, wherein the cooling step takes place before the heating step when producing the multiple layer material.

* * * * *